United States Patent
Shaked et al.

(10) Patent No.: US 6,742,708 B2
(45) Date of Patent: Jun. 1, 2004

(54) FIDUCIAL MARK PATTERNS FOR GRAPHICAL BAR CODES

(75) Inventors: Doron Shaked, Haifa (IL); Avi Levy, Tivon (IL); Jonathan Yen, San Jose, CA (US); Chit Wei Saw, Cupertino, CA (US); Clayton Brian Atkins, Mountain View, CA (US)

(73) Assignee: Hewlett-Packard Development Company, L.P., Houston (US)

( * ) Notice: Subject to any disclaimer, the term of this patent is extended or adjusted under 35 U.S.C. 154(b) by 3 days.

(21) Appl. No.: 09/877,517

(22) Filed: Jun. 7, 2001

(65) Prior Publication Data

US 2002/0186884 A1 Dec. 12, 2002

(51) Int. Cl.$^7$ ................................. G06K 7/10
(52) U.S. Cl. ........................ 235/462.01; 235/462.04; 235/462.08; 235/494; 235/462.15
(58) Field of Search ................ 235/462.01, 462.04, 235/462.08, 462.1, 462.15, 494

(56) References Cited

U.S. PATENT DOCUMENTS

| | | | |
|---|---|---|---|
| 4,777,357 A | | 10/1988 | Harada |
| 4,924,078 A | * | 5/1990 | Sant'Anselmo et al. .... 235/494 |
| 5,337,361 A | | 8/1994 | Wang |
| 5,541,396 A | * | 7/1996 | Rentsch ....................... 235/454 |
| 5,591,956 A | | 1/1997 | Longacre, Jr. |
| 5,866,895 A | * | 2/1999 | Fukuda et al. ............... 235/494 |
| 5,897,669 A | * | 4/1999 | Matsui .................. 235/462.07 |
| 5,898,166 A | * | 4/1999 | Fukuda et al. ............... 235/494 |
| 6,116,510 A | * | 9/2000 | Nishino ....................... 235/494 |
| 6,256,398 B1 | * | 7/2001 | Chang ......................... 382/100 |
| 6,364,209 B1 | * | 4/2002 | Tatsuta et al. ............... 235/494 |

FOREIGN PATENT DOCUMENTS

EP 1087325 A2 3/2001

OTHER PUBLICATIONS

Antognini et al., "A Flexibly Configurable 2D Bar Code," pp. 1–36 (before Jun. 7, 2000) (http://www.paperdisk.com/ibippa–pr.htm).

* cited by examiner

*Primary Examiner*—Michael G. Lee
*Assistant Examiner*—Steven S. Paik

(57) ABSTRACT

Fiducial mark patterns for graphical bar codes (i.e., images that contain inconspicuous graphical modulations that encode embedded information) that are characterized by high detection robustness and good local deformation tracking are described. In one bar coding method, a base image is modulated with a graphical encoding of a message to produce a graphical bar code, and a fiducial mark pattern comprising a plurality of dots arranged to track one or more reference locations and local deformation across the graphical bar code is generated. In another bar coding method, fiducial mark candidates are identified in a fiducial mark pattern, a fiducial mark path is computed based upon one or more of the identified fiducial mark candidates, and one or more reference locations are identified based upon the computed fiducial mark path.

25 Claims, 4 Drawing Sheets

FIDUCIAL MARK PATTERNS FOR GRAPHICAL BAR CODES

CROSS-REFERENCE TO RELATED APPLICATIONS

This application relates to the following co-pending applications, each of which is incorporated herein by reference: U.S. patent application Ser. No. 09/579,010, filed May 25, 2000, by Doron Shaked et al., and entitled "A Method and Apparatus for Generating and Decoding a Visually Significant Bar Code;" U.S. patent application Ser. No. 09/429,515, filed Oct. 28, 1999 by Renato Kresch et al., and entitled "System and Method for Counterfeit Protection;" U.S. Ser. No. 09/728,292, filed Dec. 1, 2000, by Jonathan Yen et al., and entitled "Authenticable Graphical Bar Codes;" U.S. patent application Ser. No. 09/578,843, filed May 25, 2000, by Doron Shaked et al., and entitled "Geometric Deformation Correction Method and System for Dot Pattern Images;" U.S. Ser. No. 09/877,516, filed on even date herewith, by Doron Shaked et al., and entitled "Generating and Decoding Graphical Bar Codes"; and U.S. patent application Ser. No. 09/877,581, filed on even date herewith, by Jonathan Yen et al., and entitled "Automatically Extracting Graphical Bar Codes".

TECHNICAL FIELD

This invention relates to fiducial mark patterns for graphical bar codes.

BACKGROUND

A typical bar code symbol is a pattern of parallel bars and spaces of various widths that represent data elements or characters. The bars represent strings of binary ones and the spaces represent strings of binary zeros. A conventional "one-dimensional" bar code symbol contains a series of bars and spaces that vary only in a single dimension. One-dimensional bar code symbols have relatively small information storage capacities. "Two-dimensional" bar codes have been developed to meet the increasing need for machine-readable symbols that contain more information than one-dimensional bar code symbols. The information storage capacity of two-dimensional bar code symbols is increased relative to one-dimensional bar codes by varying the bar code patterns in two dimensions. Common two-dimensional bar code standards include PDF417, Code 1, and Maxicode. One-dimensional and two-dimensional bar code symbols typically are read by optical scanning techniques (e.g., by mechanically scanned laser beams or by self-scanning charge-coupled devices (CCD's)) that convert a printed bar code symbol into electrical signals. The electrical signals are digitized and decoded to recover the data encoded in the printed bar code symbol.

Bar codes may be used in a variety of applications, including low information content applications (e.g., automatic price tagging and inventory management), and relatively high information content applications (e.g., encoding mail addresses and postage for automated mail reading and mail distribution systems, and encoding compressed content of a printed page).

SUMMARY

As used herein, the term "graphical bar code" broadly refers to an image that contains inconspicuous graphical modulations that encode embedded information. The invention features fiducial mark patterns for graphical bar codes that are characterized by high detection robustness and good local deformation tracking.

In one aspect of the invention, a base image is modulated with a graphical encoding of a message to produce a graphical bar code, and a fiducial mark pattern comprising a plurality of dots arranged to track one or more reference locations and local deformation across the graphical bar code is generated.

Embodiments in accordance with this aspect of the invention may include one or more of the following features.

The fiducial mark pattern may surround the graphical bar code.

The fiducial mark pattern preferably comprises reference color dots and background color dots. The reference color dots and the background color dots may be arranged in a repeating pattern having a characteristic period and comprising one reference color dot and one or more background color dots.

In some embodiments, the reference color dots are arranged along a rectangular fiducial mark path surrounding the graphical bar code. The rectangular fiducial mark path may have a height dimension of $1+H \cdot T$ and a width dimension of $1+W \cdot T$, where H and W have integer values of 1 or greater and T is the characteristic fiducial mark pattern period. The graphical bar code may have a height dimension of $H \cdot T - 2 \cdot \Delta - 1$ and a width dimension of $W \cdot T - 2 \cdot T - 1$, where $\Delta$ is the dot spacing between the graphical bar code and the fiducial mark pattern.

The graphical bar code and the fiducial mark pattern may be rendered with dots of the same size.

In some embodiments, the fiducial mark pattern comprises at least one orientation mark. The orientation mark may be located at a corner position of the fiducial mark pattern. The orientation mark preferably is different from other marks of the fiducial mark pattern.

In another aspect of the invention, fiducial mark candidates are identified in a fiducial mark pattern, a fiducial mark path is computed based upon one or more of the identified fiducial mark candidates, and one or more reference locations are identified based upon the computed fiducial mark path.

Embodiments in accordance with this aspect of the invention may include one or more of the following features.

Global deformations in the graphical bar code may be corrected based upon the one or more reference locations.

Fiducial mark candidates may be identified by identifying centers of reference color dots in the fiducial mark pattern. Identified fiducial mark candidates having dot sizes that are larger than a selected dot size may be discarded. Identified fiducial mark candidates that are spaced from the computed fiducial mark path by more than a selected distance also may be discarded.

A fiducial mark candidate located within a selected range from one of the identified reference locations preferably is identified as a valid fiducial mark and its location preferably is identified as a reference location for a neighboring fiducial mark candidate. A fiducial mark candidate that is spaced outside of a selected range from an identified reference location may be discarded.

In some embodiments, the orientation of the graphical bar code may be identified based upon an asymmetric fiducial mark candidate in the fiducial mark pattern.

Other features and advantages of the invention will become apparent from the following description, including the drawings and the claims.

DETAILED DESCRIPTION

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements, and are not drawn to scale.

Figure 1:
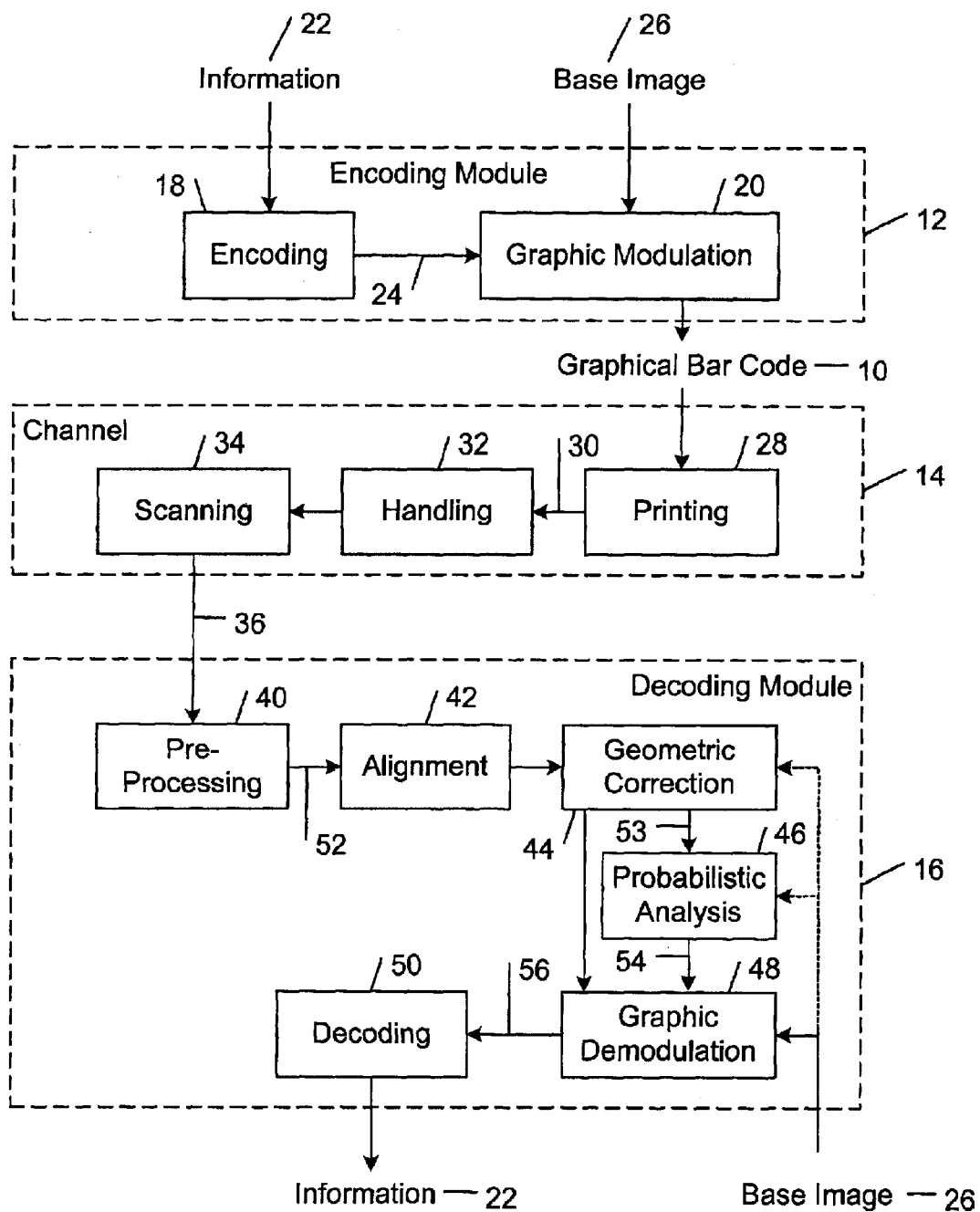
FIG. 1 is a block diagram of an encoding module, a decoding module, and document-handling channel through which one or more graphical bar codes may be transmitted.

Referring to FIG. 1, in one embodiment, a graphical bar code 10 may be generated by an encoding module 12, processed through a document-handling channel 14, and decoded by a decoding module 16.

Encoding module 12 includes an encoding stage 18 and a graphic modulation stage 20. Encoding module 12 may be implemented as one or more program modules that are executable on a computer or other programmable processor. In operation, encoding module 12 encodes information 22 into an encoded message 24. For example, information 22 may be compressed in accordance with a conventional compression algorithm, and encoded with an error correction code. Error correction coding provides robustness to errors due to degradations introduced by document-handling channel 14. The error correction codes also may be interleaved to protect against burst errors. In some embodiments, encoding module 12 may be programmed to generate from information 22 a corroborative signed message in accordance with the encoding process described in U.S. Ser. No. 09/728,292, filed Dec. 1, 2000, by Jonathan Yen et al., and entitled "Authenticable Graphical Bar Codes." During the encoding stage 18, the compressed and error correction coded message is translated into an ordered sequence of information-encoding graphical templates. During the graphic modulation stage 20, a base image 26 is modulated in accordance with the ordered sequence of graphical templates to produce graphical bar code 10. Base image 26 may be any graphical pattern, including a logo (e.g., a company logo), graphics, pictures, text, images, or any pattern that has visual significance. Information 22 may be embedded in the graphical design of text, pictures, images, borders, or the background of base image 26 to produce graphical bar code 10. Information 22 may be embedded in graphical bar code 10 in the form of a binary image (e.g., a dark and bright dot pattern), a multilevel image (e.g., a gray-level image), or a multilevel color image.

In the document-handling channel 14, graphical bar code 10 may be converted into one or more hard copies 30 by a printing stage 28. Hard copies 30 may be processed through a handling stage 32 before being converted into an electronic scanned image 36 by a scanning stage 34. Graphical bar code 10 may be printed by a conventional printer (e.g., a LaserJet® printer available from Hewlett-Packard Company of Palo Alto, Calif., U.S.A.) or a special-purpose label printing device. Hard copies 30 may be in the form of any one of a wide variety of printed materials, including a bank draft (or check) carrying a graphical bar code of a withdrawal authorization signature, a stock certificate or bond carrying a graphical bar code of an authenticity certification, and an envelope carrying a graphical bar code of postage indicia. Hard copies 30 may be scanned by a conventional desktop optical scanner (e.g., a ScanJet® scanner available from Hewlett-Packard Company of Palo Alto, Calif., U.S.A.) or a portable scanner (e.g., a CapShare® portable scanner available from Hewlett-Packard Company of Palo Alto, Calif., U.S.A.). The scanned image 36 that is acquired by the scanner and introduced into decoding module 16 is a degraded version of the original graphical bar code 10. These degradations may be generated at one or more of the document-handling channel stages, including the printing stage 28, the handling stage 32 (e.g., copying degradations, stains, folds, staples, and markings), and the scanning stage 34.

In general, decoding module 16 includes a pre-processing stage 40, an alignment stage 42, a geometric correction stage 44, an optional probabilistic analysis stage 46, a graphic demodulation stage 48, and a decoding stage 50. Decoding module 16 may be implemented as one or more program modules that are executable on a computer or other programmable processor. During the pre-processing stage 40, a scanned graphical bar code image 52 may be located in scanned image 36, and non-bar code regions may be cropped and trimmed from scanned image 36, as described in U.S. patent application Ser. No. 09/877,581, filed on even date herewith, by Jonathan Yen et al., and entitled "Automatically Extracting Graphical Bar Codes". During the alignment stage 42, fiducial marks are detected in scanned bar code image 52. The configuration of the detected fiducial marks indicates the type of global deformations that might have been introduced into the graphical bar code during transmission of graphical bar code 10 through document handling channel 14. These global deformations (e.g., translational, rotational, affine and skew distortions) may be corrected during the geometric correction stage 44 as described in U.S. patent application Ser. No. 09/578,843, filed May 25, 2000, by Doron Shaked et al., and entitled "Geometric Deformation Correction Method and System for Dot Pattern Images." During the probabilistic analysis stage 46, in one embodiment, probability models are applied to pixel value measurements obtained from the aligned and geometrically-corrected scanned bar code image 53 to produce a set of probability parameters 54. As explained in U.S. Ser. No. 09/877,516, filed on even date herewith, by Doron Shaked et al., and entitled "Generating and Decoding Graphical Bar Codes", the probability parameters 54 are used during the graphic demodulation stage 48 to select the most likely sequence of information encoding graphical templates that corresponds to the graphical template sequence that was originally encoded into base image 26. The selected graphical template sequence is translated into an encoded message 56 that is decoded into information 22 by the decoding stage 50.

Figure 2:
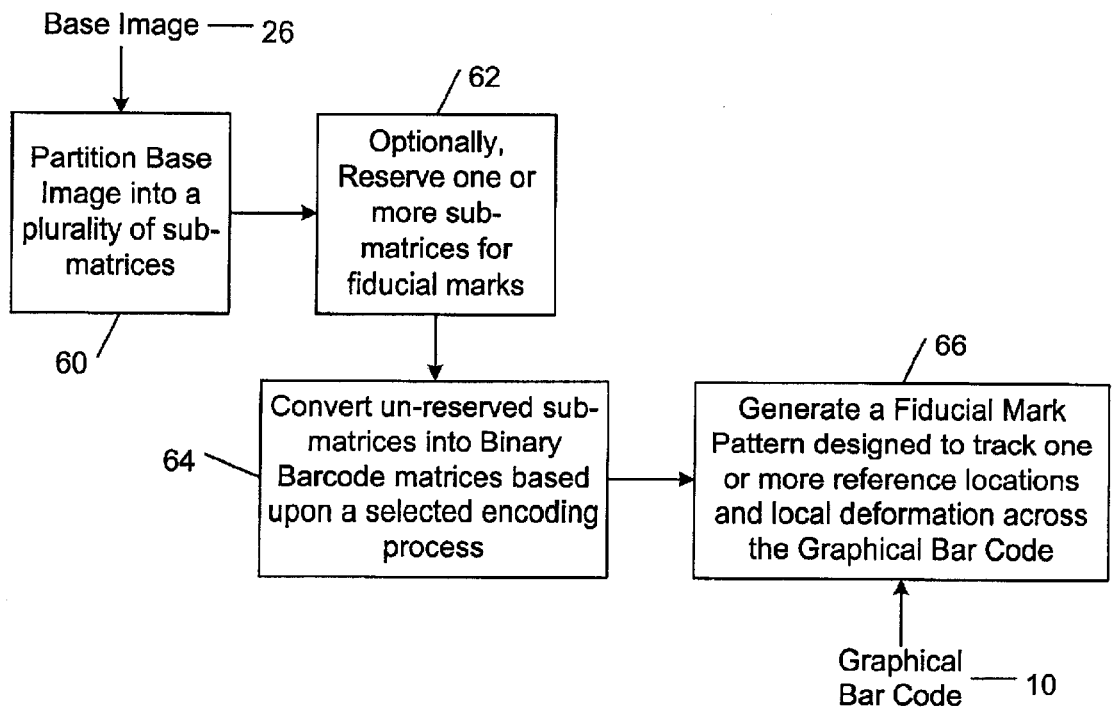
FIG. 2 is a flow diagram of a method of rendering a base image with a graphical encoding of information and generating a fiducial mark pattern designed to track one or more reference locations and local deformation across the resulting graphical bar code.

Referring to FIG. 2, graphical bar code 10 may be produced by graphically modulating base image 26 in accordance with the following graphical encoding process. Base image 26 is partitioned into a plurality of sub-matrices (or sub-images) (step 60). For example, if base image 26 is an M×N pixel image, it may be partitioned into a regular array of O K×K pixel sub-matrices, where O=M×N/(K×K). Optionally, one or more base image sub-matrices may be reserved for fiducial marks (step 62). Un-reserved sub-matrices are converted into binary bar code matrices based upon a selected graphical encoding process (step 64). For example, in one graphical encoding embodiment, information 22 may be encoded into a bi-level image by a two-bit encoding process based upon the two-by-two halftone patterns (or matrices) described in U.S. patent application Ser. No. 09/579,010, filed May 25, 2000, by Doron Shaked et al., and entitled "A Method and Apparatus for Generating and Decoding a Visually Significant Bar Code." In another graphical encoding embodiment, un-reserved sub-matrices may be converted into binary bar code matrices by applying an invertible graphical operation (e.g., an XOR graphical operation) between the un-reserved sub-matrices and a sequence of information-encoding graphical templates that is ordered in accordance with the information 22 to be encoded, as described in U.S. Ser. No. 09/877,516, filed on even date herewith, by Doron Shaked et al., and entitled "Generating and Decoding Graphical Bar Codes". As explained in detail below, a fiducial mark pattern is generated to track one or more reference locations and local deformation across the resulting graphical bar code (step 66).

Figure 3:
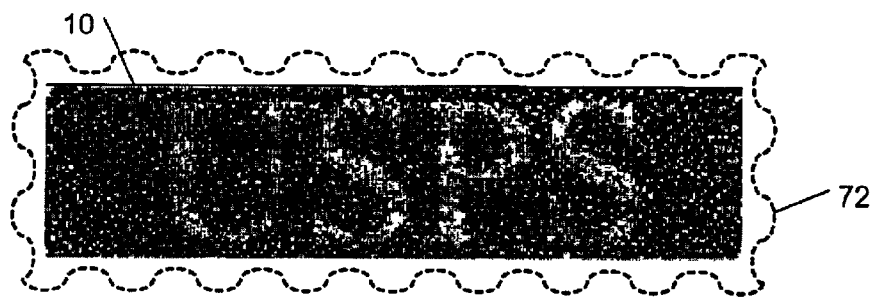
FIG. 3 is a diagrammatic view of a fiducial mark pattern surrounding a graphical bar code.

Referring to FIG. 3, in one embodiment, a graphical bar code 10 (representing, e.g., a United States Postal Service logo) is surrounded by a fiducial mark pattern 72 that includes a plurality of dots that are arranged with respect to graphical bar code 10 to track one or more reference locations and local deformation across the graphical bar code. As used herein, the term "dot" refers to any marking that is used to render a graphical bar code or a fiducial mark pattern regardless of shape. For example, dots may have a rectangular shape or any other geometric shape. In general, the fiducial mark pattern is characterized by a readily detectable signal pattern that allows valid fiducial marks to be distinguished from invalid fiducial marks, and allows missing fiducial marks to be interpolated from valid fiducial marks. The resulting combination of valid and interpolated fiducial marks provides reliable indications of reference locations and local deformation across graphical bar code 10. Fiducial mark pattern 72 may be formed from two or more different color dots arranged along a wide variety of paths that cover a substantial portion of the graphical bar code dimensions. The fiducial mark paths may be curved or straight, and may surround or run through graphical bar code 10. Graphical bar code 10 and fiducial mark pattern 72 may be rendered with dots of the same size or different size dots.

Figure 4:
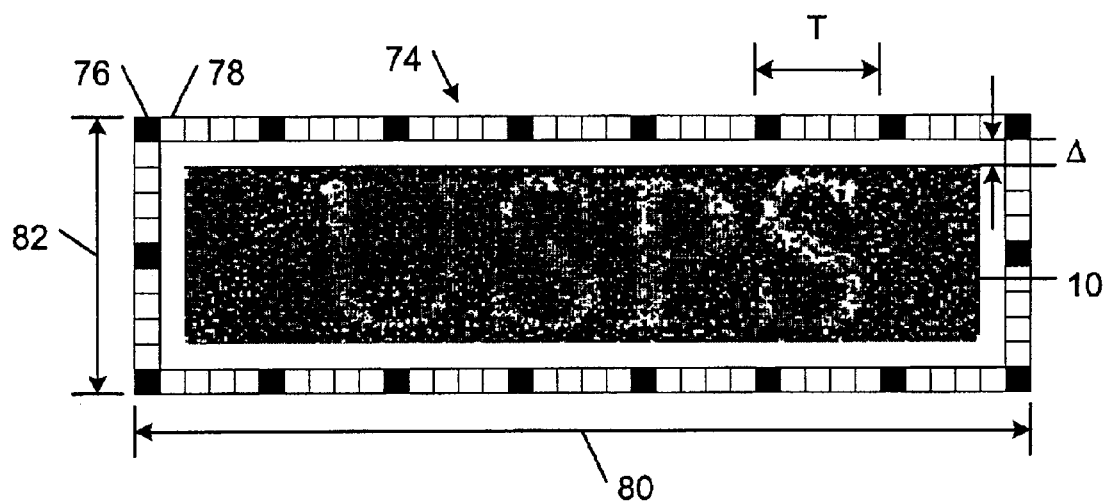
FIG. 4 is a diagrammatic view of a fiducial mark pattern that is formed from a repeating pattern of one reference color dot and four background color dots.

Referring to FIG. 4, in one embodiment, a fiducial mark pattern 74 includes a plurality of reference color dots (e.g., the dark dots 76) and background color dots (e.g., the bright dots 78 shown in outline) that are arranged along a rectangular fiducial mark path surrounding graphical bar code 10. The reference color dots 76 and background color dots 78 are arranged in a repeating signal pattern that includes one reference color dot and four background color dots and has a period (T) of five dots. The rectangular fiducial mark path has a width dimension 80 of 1+7·T (or 36) dots and a height dimension 82 of 1+2·T (or 11) dots. In general, in order to repeat the characteristic signal pattern, rectangular fiducial mark paths have width dimensions given by 1+W·T and height dimensions of 1+H·T, where W and H have integer values of 1 or greater and correspond to the number of repeating signal patterns disposed along the width and height dimensions 80, 82 of the fiducial mark path, respectively. In some embodiments, in order to provide a readily detectable spatial relationship between the dot locations of graphical bar code 10 and fiducial mark pattern 74, graphical bar code 10 is spaced from fiducial mark pattern 74 by an integer number of dots, A, which corresponds to the number of dots between the outer edge of graphical bar code 10 and the inner edge of fiducial mark pattern 74. Accordingly, with respect to the above-defined fiducial mark path dimensions, graphical bar code 10 may have a width dimension of W·T−2·Δ−1 and a height dimension of H·T−2·Δ−1.

Figure 5:
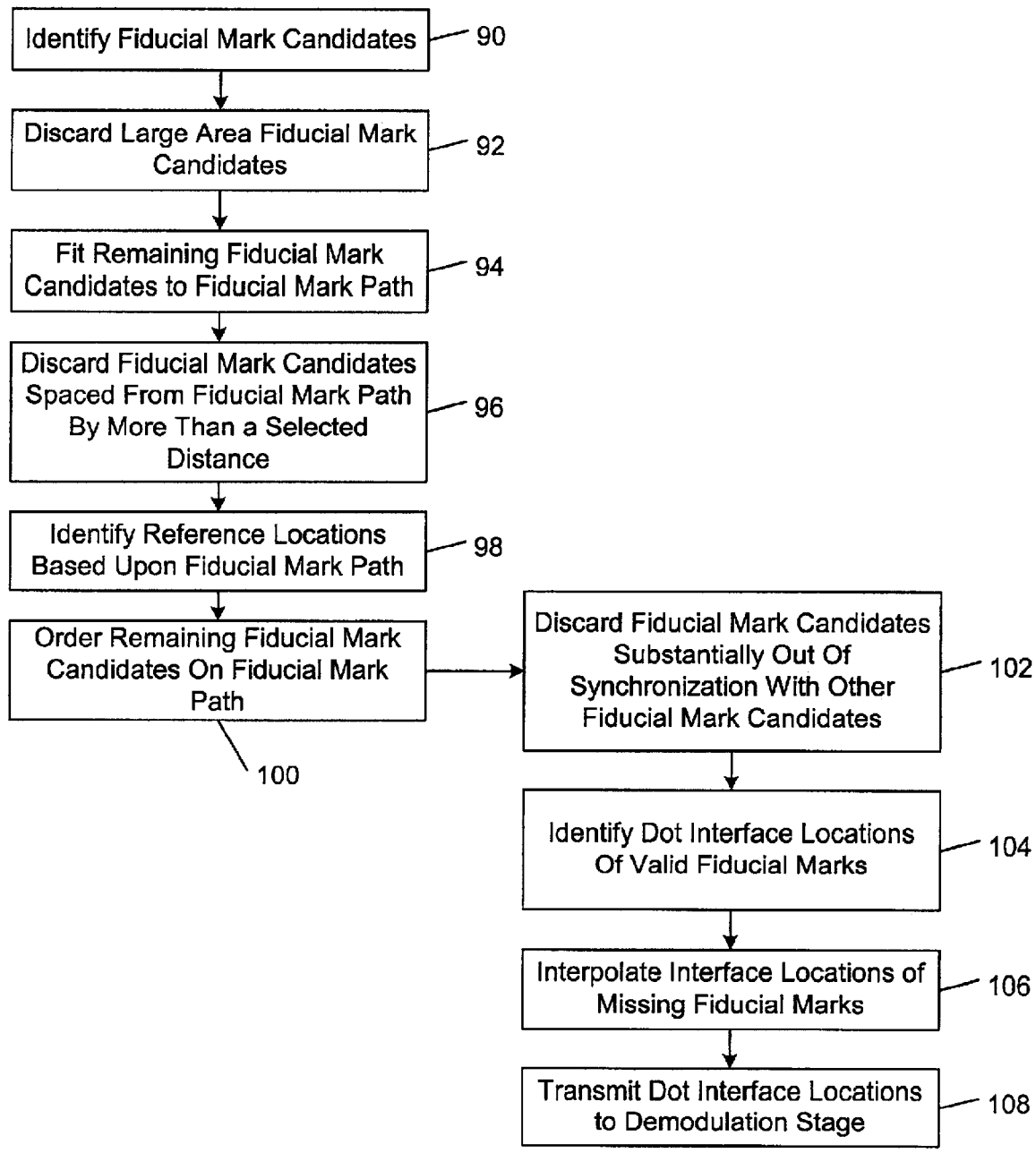
FIG. 5 is a flow diagram of a method of distinguishing valid fiducial marks from invalid fiducial marks in a scanned image and interpolating missing fiducial marks to obtain information from which local deformation in a scanned graphical bar code image may be corrected.

Referring to FIG. 5, in one embodiment, valid fiducial marks may be distinguished from invalid fiducial marks in scanned image 36, and missing fiducial marks may be interpolated from valid fiducial marks to obtain information from which local deformations in the scanned graphical bar code may be corrected, as follows.

Initially, fiducial mark candidates are identified (step 90). In one embodiment, fiducial mark candidates are identified by detecting the dot centers of reference color dots 76. A zigzag scan that begins at the upper left corner of fiducial mark pattern 74 may be used during the detection process. The first detected reference color pixel of each scan (requires a threshold) is considered part of the corresponding fiducial mark candidate and is used as an anchor pixel for that mark. Next, a conventional flood-fill algorithm is used to locate all reference color pixels connected to the anchor pixels. The centers of the fiducial mark candidates are located at the center of mass of the pixels of each mark. Additional details regarding the process of identifying fiducial mark candidates may be obtained from U.S. patent application Ser. No. 09/579,010, filed May 25, 2000, by Doron Shaked et al., and entitled "A Method and Apparatus for Generating and Decoding a Visually Significant Bar Code." Next, large area (relative to an expected dot count) fiducial mark candidates are discarded as outliers (step 92). The remaining detected fiducial mark candidates are fit to an expected fiducial mark path (step 94). In embodiments having fiducial mark paths formed from linear path segments (e.g., rectangular fiducial mark paths), a conventional least squares line fitting process or a conventional robust linear fitting process may be used to compute the linear path segments of the fiducial mark paths. Fiducial mark candidates with dot centers that are spaced from the computed fiducial mark path by more than a selected distance are discarded (step 96). One or more reference locations are identified based upon the computed fiducial mark path (step 98). For example, in embodiments having fiducial mark paths formed from linear path segments, the intersections of the computed linear path segments of the fiducial mark path may be identified as reference corner locations. The identified reference corner locations may be used to correct global deformation across graphical bar code 10, as described in U.S. patent application Ser. No. 09/579,010, filed May 25, 2000, by Doron Shaked et al., and entitled "A Method and Apparatus for Generating and Decoding a Visually Significant Bar Code."

Next, the remaining fiducial mark candidates are ordered on the computed fiducial mark path (step 100). Fiducial mark candidates that are substantially out of synchronization with other fiducial mark candidates are discarded as outliers (step 102). As explained above, the originally generated fiducial mark signal pattern may include a repeating pattern of one reference color dot and one or more background color dots. As a result, the center of each valid fiducial mark is expected to be located within a selected range (i.e., an integer multiple of the signal period plus-or-minus a selected deformation threshold) of other valid fiducial marks. For example, in one embodiment, the synchronization process begins at an identified reference location (e.g., a corner reference location). A first fiducial mark candidate that is located within a selected range of the computed reference corner location is identified as a valid fiducial mark and its location is identified as a reference location for the next fiducial mark candidate. The first valid fiducial mark may be correspond to the first expected fiducial mark location, in which case the fiducial mark candidate would be expected to be spaced from a computed reference corner location by a distance of T±δ dots (where δ may be a fraction of a dot spacing). If one or more of the fiducial mark candidates neighboring the computed corner location are missing (e.g., because they were not detected or because they were discarded as outliers), the first valid fiducial mark would be expected to be spaced from a computed reference corner location by a distance of N·(T±δ dots) (where N has an integer value greater than one). The expected locations of the remaining valid fiducial marks may be computed based upon updated reference locations in a similar way.

Dot interface locations of valid fiducial marks are identified (step 104). The dot interface locations may be computed as described in U.S. patent application Ser. No. 09/578,843, filed May 25, 2000, by Doron Shaked et al., and entitled "Geometric Deformation Correction Method and System for Dot Pattern Images." The dot interface locations of missing fiducial marks may be interpolated from the computed valid dot interface locations using, for example, a conventional interpolation process (step 106). The dot interface locations then may be transmitted to graphic demodulation stage 48 (step 108). The computed dot interface locations provide a new, non-Cartesian coordinate system that may be used by graphic demodulation stage 48 to correct space deformation across graphical bar code 10.

Figure 6:
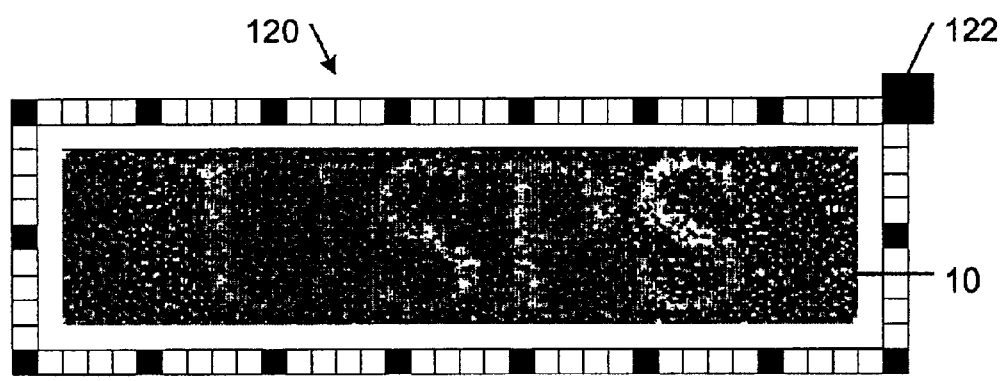
FIG. 6 is a diagrammatic view of a fiducial mark pattern that includes an asymmetric orientation mark.

As shown in FIG. 6, in some embodiments, a fiducial mark pattern 120 may include at least one orientation mark 122 that is different (or asymmetric) from the other fiducial marks. The orientation marks may be detected readily and their locations may be used to determine the proper orientation of graphical bar code 10 before the decoding process is initiated. In this way, problems associated with determining the proper orientation of rotationally symmetric graphical bar codes may be avoided. The orientation marks may have a different size than the other fiducial marks. For example, in the embodiment of FIG. 6, orientation mark 122 has an area that is twice the size of the area of each of the other fiducial marks of fiducial mark pattern 120. In other embodiments, the orientation marks may have a different shape than the other fiducial marks. Any two of a wide variety of different dot shapes may be used to render the orientation and other fiducial marks, including circular shapes, square shapes, cross shapes, hexagonal shapes, and rectangular shapes. Preferably, orientation marks are positioned at corner locations of the fiducial mark pattern; however, orientation marks also may be positioned at other locations (e.g., the center location) along one side of the fiducial mark path.

The systems and methods described herein are not limited to any particular hardware or software configuration, but rather they may be implemented in any computing or processing environment, including in digital electronic circuitry or in computer hardware, firmware or software. The encoding and decoding modules may be implemented, in part, in a computer program product tangibly embodied in a machine-readable storage device for execution by a computer processor. In some embodiments, these modules preferably are implemented in a high level procedural or object oriented programming language; however, the algorithms may be implemented in assembly or machine language, if desired. In any case, the programming language may be a compiled or interpreted language. The encoding and decoding methods described herein may be performed by a computer processor executing instructions organized, e.g., into program modules to carry out these methods by operating on input data and generating output. Suitable processors include, e.g., both general and special purpose microprocessors. Generally, a processor receives instructions and data from a read-only memory and/or a random access memory. Storage devices suitable for tangibly embodying computer program instructions include all forms of non-volatile memory, including, e.g., semiconductor memory devices, such as EPROM, EEPROM, and flash memory devices; magnetic disks such as internal hard disks and removable disks; magneto-optical disks; and CD-ROM. Any of the foregoing technologies may be supplemented by or incorporated in specially-designed ASICs (application-specific integrated circuits).

Other embodiments are within the scope of the claims.
What is claimed is:
1. A bar coding method, comprising:
   modulating a base image with a graphical encoding of a message to produce a graphical bar code; and
   generating a fiducial mark pattern comprising a plurality of dots surrounding the graphical bar code and arranged to track one or more reference locations and local deformation across the graphical bar code.
2. The method of claim 1, wherein the fiducial mark pattern comprises reference color dots of a prescribed color and background color dots of a prescribed color different from the prescribed color of the reference color dots.
3. The method of claim 2, wherein the fiducial mark pattern comprises reference color dots and the background color dots surrounding the graphical bar code and arranged in a repeating pattern having a characteristic period and comprising one reference color dot and one or more background color dots.
4. The method of claim 3, wherein the reference color dots are arranged along a rectangular fiducial mark path surrounding the graphical bar code.
5. The method of claim 4, wherein the rectangular fiducial mark path has a height dimension of 1+H·T and a width dimension of 1+W·T, where H and W have integer values of 1 or greater and T is the characteristic fiducial mark pattern period.
6. The method of claim 5, wherein the graphical bar code has a height dimension of H·T−2·Δ−1 and a width dimension of W·T−2·T−1, where Δ is the dot spacing between the graphical bar code and the fiducial mark pattern.
7. The method of claim 1, further comprising rendering the graphical bar code and the fiducial mark pattern with dots of the same size.
8. The method of claim 1, wherein the fiducial mark pattern comprises at least one orientation mark.
9. The method of claim 8, wherein the orientation mark is located at a corner position of the fiducial mark pattern.
10. The method of claim 8, wherein the orientation mark is different from other marks of the fiducial mark pattern in size, shape, or both size and shape.
11. The method of claim 1, wherein the dots of the fiducial mark pattern are arranged to track local deformations in two dimensions across the graphical bar code.
12. The method of claim 11, wherein local deformations in the graphical bar code are tracked based upon fiducial mark interface locations.

13. A computer program residing on a computer-readable medium and comprising computer-readable instructions for causing a computer to:

modulate a base image with a graphical encoding of a message to produce a graphical bar code; and generate a fiducial mark pattern comprising a plurality of dots surrounding the graphical bar code and arranged to track one or more reference locations and local deformation across the graphical bar code.

14. The computer program of claim 13, wherein the fiducial mark pattern comprises reference color dots and the background color dots surrounding the graphical bar code and arranged in a repeating pattern having a characteristic period and comprising one reference color dot and one or more background color dots.

15. The computer program of claim 14, wherein the dots of the fiducial mark pattern are arranged to track local deformations in two dimensions across the graphical bar code.

16. The computer program of claim 15, wherein local deformations in the graphical bar code are tracked based upon fiducial mark interface locations.

17. A bar coding method, comprising:

identifying fiducial mark candidates in a fiducial mark pattern comprising a plurality of dots surrounding a graphical bar code comprising a base image modulated with a graphical encoding of a message;

computing a fiducial mark path based upon one or more of the identified fiducial mark candidates;

identifying one or more reference locations based upon the computed fiducial mark path; and correcting local deformations in the graphical bar code based upon fiducial mark interface locations computed based on identified fiducial mark candidates.

18. The method of claim 17, further comprising correcting global deformations in the graphical bar code based upon the one or more reference locations.

19. The method of claim 17, wherein identifying fiducial mark candidates comprises identifying centers of reference color data in the fiducial mark pattern.

20. The method of claim 17, further comprising discarding identified fiducial mark candidates having dot sizes larger than a selected dot size.

21. The method of claim 17, further comprising discarding identified fiducial mark candidates spaced from the computed fiducial mark path by more than a selected distance.

22. The method of claim 17, wherein a fiducial mark candidate located within a selected range from one of the identified reference locations is identified as a valid fiducial mark and its location is identified as a reference location for a neighboring fiducial mark candidate.

23. The method of claim 22, further comprising discarding a fiducial mark candidate spaced outside of a selected range from an identified reference location is discarded.

24. The method of claim 17, further comprising identifying the orientation of the graphical bar code based upon an asymmetric fiducial mark candidate in the fiducial mark pattern.

25. A computer program residing on a computer-readable medium and comprising computer-readable instructions for causing a computer to:

identify fiducial mark candidates in a fiducial mark pattern comprising a plurality of dots surrounding a graphical bar code comprising a base image modulated with a graphical encoding of a message;

compute a fiducial mark path based upon one or more of the identified fiducial mark candidates;

identify one or more reference locations based upon the computed boundary path; and correct local deformations in the graphical bar code based upon fiducial mark interface locations computed based on identified fiducial mark candidates.

* * * * *